United States Patent [19]
Blair et al.

[11] Patent Number: 6,064,780
[45] Date of Patent: May 16, 2000

[54] INTERCONNECT SUBSTRATE WITH A SINGLE CONTACT ACCESSIBLE IN AN UPPER AND AN END SURFACE

[75] Inventors: Thomas H. Blair, Algonquin; Ed Myszka, St. Charles, both of Ill.; Michael S. Lebby, Apache Junction, Ariz.

[73] Assignee: Motorola, Inc., Schaumburg, Ill.

[21] Appl. No.: 08/348,414

[22] Filed: Dec. 2, 1994

[51] Int. Cl.[7] ........................................... G02B 6/12
[52] U.S. Cl. ................... 385/14; 385/27; 385/31
[58] Field of Search ................... 385/14, 31, 27, 385/24

[56] References Cited

U.S. PATENT DOCUMENTS 5,282,071  1/1994  Hartman et al. ............... 385/14 X

*Primary Examiner*—Phan T. H. Palmer
*Attorney, Agent, or Firm*—Eugene A. Parsons

[57] ABSTRACT

An interconnect substrate is provided. The interconnect substrate has a first surface with a conductive path and an end surface. The first surface and the end surface join to form a nexus or a corner. A conductive contact is positioned at the nexus, thereby bridging the first surface and the end surface, as well as providing a conductive path from the first surface to the end surface. The conductive contact is operably coupled to the conductive path.

5 Claims, 2 Drawing Sheets

6,064,780

INTERCONNECT SUBSTRATE WITH A SINGLE CONTACT ACCESSIBLE IN AN UPPER AND AN END SURFACE

FIELD OF THE INVENTION

This invention relates, in general, to fabrication of optical devices and, more particularly, to coupling photonic devices and waveguides together.

BACKGROUND OF THE INVENTION

This application relates to United States issued patent bearing U.S. Pat. No. 5,265,184, titled MOLDED WAVEGUIDE AND METHOD FOR MAKING SAME, issued on Nov. 23, 1993, and U.S. Pat. No. 5,313,545 titled MOLDED WAVEGUIDE WITH A UNITARY CLADDING REGION AND METHOD OF MAKING, issued on May 17, 1994; both of which are hereby incorporated by reference herein.

At present, coupling of electronic devices around a nexus or corner is a difficult task. Generally, fabrication methods for coupling around a corner are achieved manually, such as manual wire bonding, manual bread boarding, or the like. Thus, manual methods for coupling electronic devices around corners are complex, inefficient, costly, and unsuitable for high-volume manufacturing. With current fabrication methods and structures requiring corner coupling being hard to manufacture, corner coupling is not done, thus limiting the utilization and functional advantages of corner coupling.

It can be readily seen that current manual methods for coupling around a corner or nexus of an interconnect substrate has severe limitations. Also, it is evident that present processes used for coupling the electronic devices and the waveguide are not only complex and expensive, but ineffective. Therefore, an article and a method that allows for efficient and effective coupling of a device to an interconnect would be highly desirable.

DETAILED DESCRIPTION OF THE DRAWINGS

Figure 1:
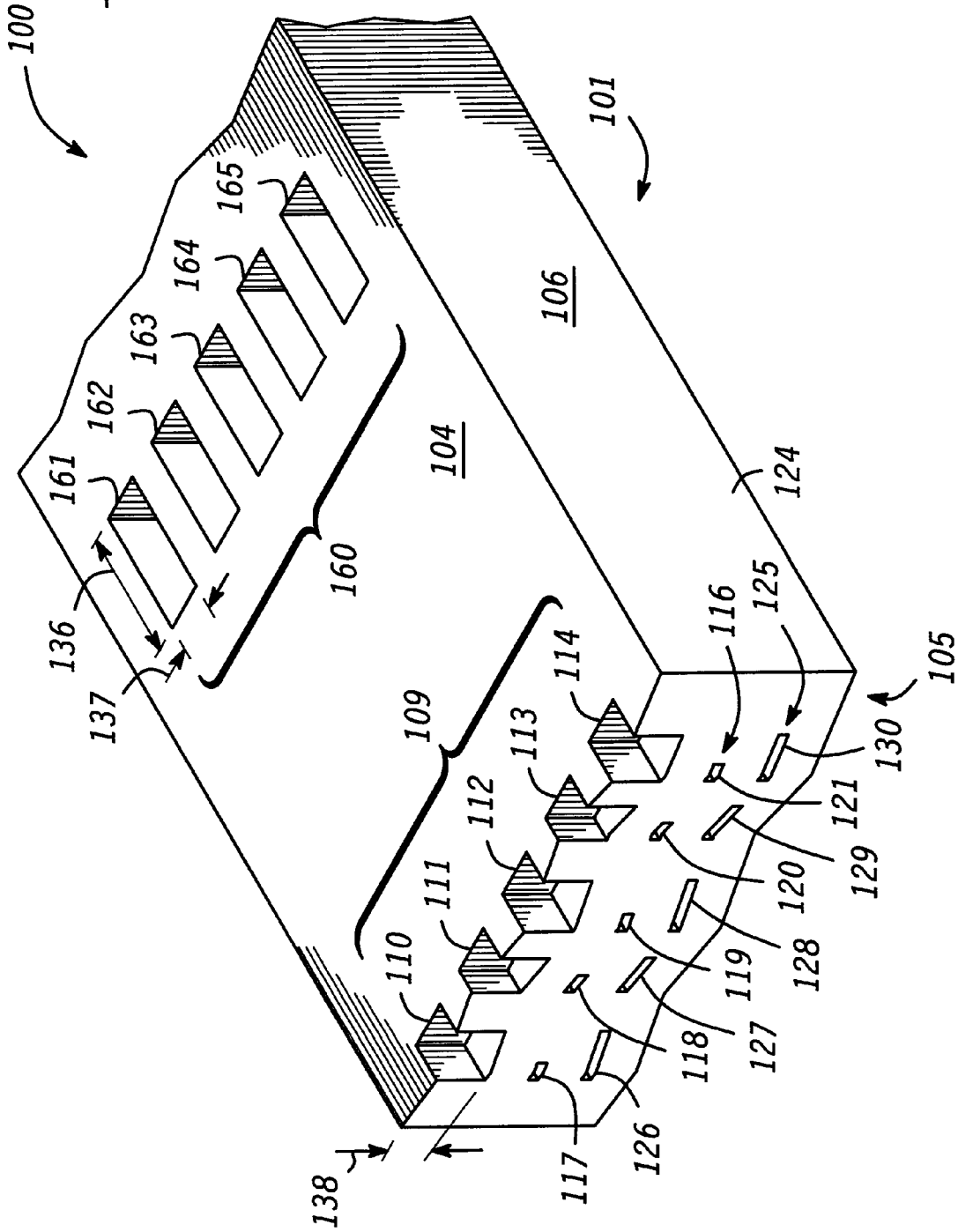
FIG. 1 illustrates a simplified enlarged partially completed interconnect substrate with parts thereof broken away.
Figure 2:
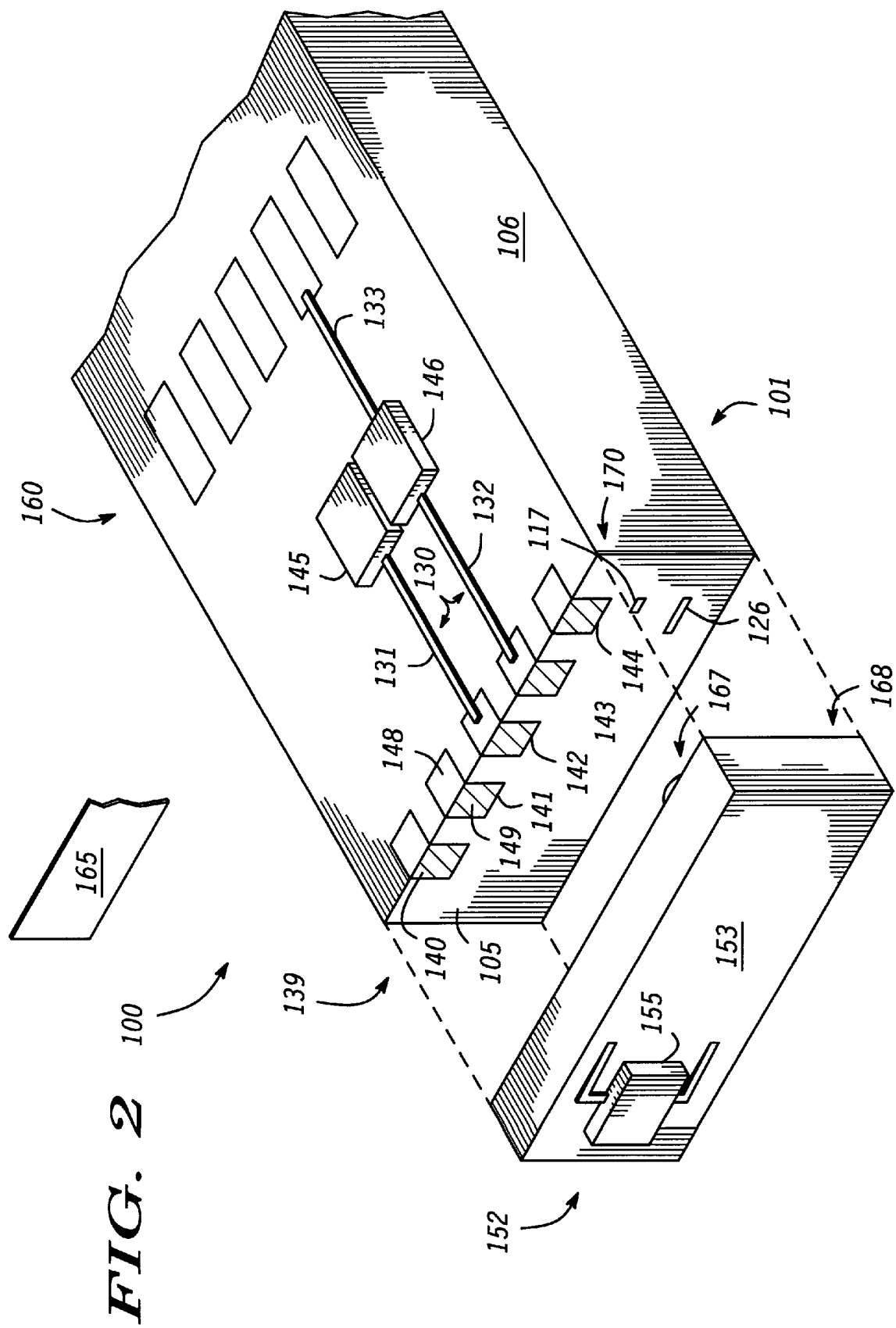
FIG. 2 illustrates a portion of a simplified enlarged interconnect substrate.

Referring now to FIGS. 1 and 2, FIG. 1 illustrates a greatly enlarged simplified partially fabricated perspective view of an interconnect device or interconnect substrate 100, with portions thereof broken away and FIG. 2 illustrates an enlarged perspective view of a portion of interconnect device 100. As shown in FIGS. 1 and 2, substrate 101 is shown in part, thereby illustrating only a portion of substrate 101. Additionally, it should be understood that substrate 101 does not represent any specific size or relative size, thus substrate 101 can be made to any suitable size for any specific application.

Referring to FIG. 1, substrate 101 is shown to include a surface 104, end surface 105, side surface 106, a plurality of openings 109 illustrated by openings 110–114, a plurality of channels 160 illustrated by channels 161–165, a plurality of core regions 116 illustrated by core regions 117–121, cladding region 124, a plurality of contacts 125 illustrated by contacts 126–130. It should be understood that end surface 105 illustrates variety of substructures, such as the plurality of core regions 116, the plurality of contacts 125, and the like in substrate 101. Further, it should be understood that while end surface 105 provides insight into substrate 101 sectioning of substrate 101 at end surface 105 at this particular time in fabrication is typically premature.

Generally, substrate 101 is made of any suitable substrate type, such as an optical substrate, an interconnect substrate, e.g., a printed circuit board (PCB), a FR4 board, a ceramic interconnect board, any combination thereof, or the like. As a result of having a wide range of possible substrates, any suitable method of manufacture is used, such as molding, layering, subtractive and additive processes, e.g., deposition and etching, combinations thereof, and the like for making substrate 101.

By way of example, in one embodiment of the present invention, with substrate 101 being a waveguide, the waveguide is fabricated having the plurality of core regions 116 surrounded by cladding region 124. Generally, the waveguide is made in accordance to the teachings provided by United States issued patents bearing U.S. Pat. No. 5,265,184, titled MOLDED WAVEGUIDE AND METHOD FOR MAKING SAME, issued on Nov. 23, 1993, and U.S. Pat. No. 5,313,545 titled MOLDED WAVEGUIDE WITH A UNITARY CLADDING REGION AND METHOD OF MAKING, issued on Feb. 19, 1993.

Briefly, the plurality of core regions 116 and the cladding region 124 are molded. Generally, molding materials are made of a hard optically transparent polymer, wherein the plurality of core regions 116 have a higher refractive index than cladding region 124, thereby providing efficient transmission and guiding of light or optical signals through the plurality of core regions 116. By way of example, the refractive index of the plurality of core regions 116 and cladding region 124 range from 1.3 to 1.7 with a difference between the plurality of core regions 116 and the cladding region 124 typically set at 0.01; however, it should be understood that any difference that allows light signals to be transmitted and guided is suitable.

In another example, of another embodiment of the present invention, with substrate 101 being a PCB, substrate 101 is fabricated as a layered structure having alternating layers of electrically conductive and insulative materials. The alternating layers are patterned by any suitable method, such as additive and subtractive techniques well known in the art. Typically, the conductive material is patterned to make electrical traces or conductive paths that are subsequently covered by the insulative material. Additionally, the electrical traces are electrically connected to any suitable electrical output device, such as pins, pads, or the like, thus allowing the electrical traces in substrate 101 to be electrically coupled to other standard electronic components.

Generally, the plurality of channels or indentations 160 are formed in surface 104 by any suitable method or technique, such as molding, laser ablating, milling, or the like. However, in a preferred embodiment of the present invention, with substrate 101 being a waveguide, the plurality of channels 160 are made during the molding process of the waveguide. The plurality of channels 160 having a length 136 and a width 137, and a depth 138 are made to any suitable size. For example, length 136, width 137, and depth 138 are all in the range of 5.0 millimeters to 5.0 microns, with a preferred range of 3.0 millimeters to 1.0 millimeter, and a nominal size on the order of 1.5 millimeters.

Further, positioning of the plurality of channels 160 typically is in correlation or aligned to the substructures underlying surface 104, such as the plurality of core regions 116 and the plurality of contacts 125, thereby enabling interactive coupling of the plurality of channels 160 with the substructures underlying surface 104.

Once the channels have been formed in surface 104 of substrate 101, an electrically conductive material, such as a solder paste, an electrically conductive epoxy, or the like is applied to surface 104 of substrate 101. Generally, if the electrically conductive material is a liquid or a semi-liquid, the liquid or semi-liquid is allowed to flow into the plurality of channels 160 to completely fill the plurality of channels 160. Residue of the liquid or semi-liquid is removed by any suitable method such as squegging off surface 104 or the like. However, if a more solid material such as a conductive paste or a solder paste is used, heat is applied to flow the conductive paste or solder paste into the plurality of channels 160. Typically, the conductive paste has a low melting temperature that ranges from 50.0–150 degrees Celsius, with a preferred range from 75.0 to 125.0 degrees Celsius. Additionally, it should be understood that with some of the electrically conductive material an additional curing step is necessary to fully activate and provide appropriate material characteristics.

Referring now to FIG. 2, upon completion of filling of the plurality of channels 160, the plurality of electrical traces or conductive paths 130 are formed on surface 104 of substrate 101. Generally, the plurality of electrical traces 130 are formed by any suitable method. Briefly and by way of example, with substrate 101 having the plurality of channels 160 being filled, a film or layer of conductive material is applied to surface 104 of substrate 101. The conductive material is made of any suitable material or alloy, such as aluminum, titanium, tungsten, copper, aluminum copper, or the like. The conductive material on surface 104 is then patterned to make the plurality of electrical traces 130 represented by electrical traces 131 and 132. Typically, patterning of the conductive material is achieved by a combination of photolithography and etching processes. For example, a photoactive material such as photoresist is applied to the layer of conductive material. The photoactive material is exposed and developed, thereby exposing portions of the conductive material, while other portions of the conductive material are covered or masked. Substrate 101 is then etched, thereby removing the exposed portions of the conductive material while the masked or covered portions remain. After the etch, the remaining photoactive material is removed, thereby generating the plurality of electrical traces 130. It should be understood that while the plurality of electrical traces 130 are shown in a simplified form, the plurality of electrical traces 130 can be complicated, thereby enabling electrical signals to be conducted across and throughout substrate 101. Further, it should be understood that the plurality of electrical traces 130 can provide contact pads or bonding pads for standard electronic components, such as but not limited to integrated circuits 145 and 146.

As shown in the FIG. 2, at least one of the plurality of electrical traces 130 is operably coupled to the filled channel, thereby electrically coupling at least one of the plurality of electrical traces to the filled cavity. More specifically, electrical trace 133 extends across surface 104 to one of the plurality of channels 160 filled with the electrically conductive material. Additionally, electrical trace 131 is coupled to a portion of contact 142 that was a channel filled with an electrically conductive material.

After forming of the plurality of electrical traces 130 on surface 104 of substrate 101, substrate 101 is cleaved or cut through the plurality of channels 160 filled with the conductive material by a cutting or cleaving device 165, thereby making the plurality of contacts 139. Thus, the plurality of contacts 139 bridge surface 104 and end surface 105, thereby providing an electrical coupling apparatus around corner or nexus 170. Cleaving or cutting of substrate 101 is achieved by any suitable method, slicing with a sharp edge, laser ablation, snapping, or the like. As shown in FIG. 2, the plurality of contacts 139 can be electrically coupled or contacted on two surfaces, i.e., surface 104 and end surface 105. For example, contact 141 exposes surfaces 148 and 149 on surfaces 104 and end surface 105, respectively, thereby bridging surface 104 and end surface 105 of substrate 101. By bridging surface 104 and end surface 105, end surface 105 is usable for coupling any suitable device 152, such as an optical device, electrical device, or a combination of both optical and electrical devices to substrate 101.

Generally, device 152 is either an electronic device, a photonic device, or a combination of both electronic and photonic devices. In the case of the electronic device, the electronic device is made of a substrate 153 on which electronic components, illustrated by integrated circuit. 155, are mounted and operably coupled to the plurality of contacts 139. Typically, operable coupling of the electronic device to substrate 101 is achieved by solder bumps, illustrated by bump 167. In the case of the photonic device with a working portion 168, the photonic device can be a phototransmitter, a photoreceiver, or a combination of both. For example, when the photonic device is a phototransmitter, the phototransmitter can be any suitable phototransmitter, such as a laser, e.g., a vertical cavity surface emitting laser, a light emitting diode, or the like. Alternatively, when the photonic device is a photoreceiver, the photoreceiver can be any suitable photoreceiver, such as a photodetector, a photodiode, a p-i-n photodiode, or the like. Generally, the photonic device is made as an array having a substrate 153. Substrate 153 is positioned or aligned so that solder bump 167 electrically couples the photonic device to substrate 101, as well as optically coupling working portion 168 to core region 117, thereby electrically and optically coupling substrate 153 to the photonic device.

By now it should be appreciated that a novel method and apparatus have been described for coupling a variety of devices around a corner of a substrate. The structure allows both optical and electrical coupling between suitable devices and the substrate that is both cost effective and highly manufacturable.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method for making a interconnect substrate comprising the steps of:

forming a substrate having a first surface;

forming a channel in the substrate;

filling the channel with an electrically conductive material;

forming an electrical trace on the first surface of the substrate with at least one portion of the electrical trace operably coupled to the channel with the electrically conductive material; and cleaving the substrate through the channel with the electrically conductive material to generate a contact positioned between the first surface and an end surface, thereby bridging the first surface and the end surface with the contact being operably coupled to the electrical trace.

2. A method for making a interconnect substrate as claimed in claim 1 where, in the step of forming a conductive trace on the first surface of the substrate further includes:

applying a conductive material on the first surface of the substrate and the channel with the electrically conductive material;

forming an etch mask on the conductive material with portions of the conductive material exposed while other portions of the conductive material are masked; and etching the exposed and unexposed portions of the conductive material, there transferring a pattern to the conductive material.

3. A method for making an interconnect substrate comprising the steps of:

forming a substrate having a first surface;

forming a channel in the substrate;

filling the channel with an electrically conductive material; and cleaving the substrate through the channel with the electrically conductive material to generate a contact positioned at a nexus and an end surface, thereby bridging the first surface and the end surface.

4. A method for making an interconnect substrate as claimed in claim 3 where, in the step of forming a substrate, the substrate further includes a core region.

5. A method for making an interconnect substrate as claimed in claim 3 where, in the step of forming a substrate, the substrate further includes an electrical trace.

* * * * *